US006757798B2

(12) United States Patent
Tetrick (10) Patent No.: US 6,757,798 B2
(45) Date of Patent: Jun. 29, 2004

(54) METHOD AND APPARATUS FOR ARBITRATING DEFERRED READ REQUESTS

(75) Inventor: Raymond S. Tetrick, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/860,951

(22) Filed: May 17, 2001

(65) Prior Publication Data

US 2001/0021967 A1 Sep. 13, 2001

Related U.S. Application Data

(63) Continuation of application No. 08/884,766, filed on Jun. 30, 1997.

(51) Int. Cl.[7] .............................................. G06F 12/00
(52) U.S. Cl. ...................... 711/163; 711/152; 711/133; 711/147; 711/158
(58) Field of Search ................................ 711/152, 133, 711/147, 154, 158, 163; 710/112

(56) References Cited

U.S. PATENT DOCUMENTS

| 5,546,546 A | * | 8/1996 | Bell et al. ................ 710/112 |
| 5,666,515 A | * | 9/1997 | White et al. .............. 710/200 |
| 5,835,741 A | * | 11/1998 | Elkhoury et al. ......... 710/310 |
| 5,943,483 A | * | 8/1999 | Solomon ................... 710/107 |

* cited by examiner

Primary Examiner—Donald Sparks
Assistant Examiner—Brian R. Peugh
(74) Attorney, Agent, or Firm—Michael J. Nesheiwat (57) ABSTRACT

An apparatus according to an embodiment of the present invention is disclosed. The apparatus includes a memory interface. The memory interface determines an access time of an original read request. The memory interface outputs a data ready signal when the access time of the original read request expires. An arbiter is coupled to the memory interface. The arbiter arbitrates access to the memory interface. A blocking unit is coupled to the memory interface. The blocking unit blocks a retry of the original read request from reaching the arbiter unit until the data ready signal is output by the memory interface. According to one embodiment of the memory controller a bus interface is coupled to the memory interface. The bus interface issues a deferred read signal to the device making the original read request upon receiving a signal from the arbiter.

15 Claims, 5 Drawing Sheets

METHOD AND APPARATUS FOR ARBITRATING DEFERRED READ REQUESTS

This is a continuation of application Ser. No. 08/884,766 filed Jan. 30, 1997.

FIELD OF THE INVENTION

The present invention relates to the field of memory controllers. More specifically, the present invention relates to a method and apparatus for arbitrating deferred read requests.

BACKGROUND OF THE INVENTION

Revision 2.1 of the Peripheral Components Interconnect (PCI) Local Bus Specification, PCI Local Bus Rev. 2.1 effective Jun. 1, 1995, introduces the concept of deferred read cycles on the PCI bus. A memory read request is deferred when the request to access memory requires more than a predetermined period of time. After the predetermined period of time, the PCI master making the read request must relinquish the address and data lines to allow other PCI masters to access the memory. The memory controller instructs the PCI master making the read request to retry the read request at a later time.

Whether the PCI master is able to successfully access the memory within the predetermined period of time on its next retry depends on the traffic on the PCI bus and in the memory. If the PCI master is unable to access the memory within the predetermined period of time, the memory controller will again defer the memory read request and instruct the PCI master to retry the read request at a later time. Because the PCI master consumes PCI bus bandwidth each time it retries a read request, bandwidth that otherwise could be used to transfer data to other PCI devices is lost each time a retry is attempted and fails. In addition, the PCI master making the read request is required by the PCI Local Bus Specification to continue trying to access the memory until it is successful. The PCI master making the request is prevented from performing other tasks until it completes its read request. Thus, the requirements for deferring and completing read requests can produce inefficiencies that adversely affect the allocation of PCI bus bandwidth and the performance of PCI masters.

SUMMARY

An apparatus according to a first embodiment of the present invention is disclosed. The apparatus includes a memory interface. The memory interface determines an access time of an original read request. The memory interface outputs a data ready signal when the access time of the original read request expires. An arbiter is coupled to the memory interface. The arbiter arbitrates access to the memory interface. A blocking unit is coupled to the memory interface. The blocking unit blocks a retry of the original read request from reaching the arbiter unit until the data ready signal is output by the memory interface. According to one embodiment of the memory controller a bus interface is coupled to the memory interface. The bus interface issues a deferred read signal to the device making the original read request upon receiving a signal from the arbiter.

An apparatus according to a second embodiment of the present invention is disclosed. The apparatus includes a memory interface. The memory interface determines an access time of an original read request. The memory interface outputs a deferred read signal when the access time is longer than a predetermined period of time. The memory interface outputs a data ready signal when the access time has expired. An arbiter is coupled to the memory interface. The arbiter arbitrates access to the memory interface. A blocking mechanism is coupled to the memory interface. The blocking mechanism outputs a request signal to an arbiter unit in response to receiving a retry read request signal from a device making the original read request and the data ready signal from the memory interface.

A method for arbitrating read requests to a memory according to a third embodiment of the present invention is disclosed. An access time of a read request is determined. The read request is blocked from being retried until the access time has expired. According to one embodiment of the present invention, a device making the read request is informed that the read request must be retried if the access time is greater than a predetermined period of time. According to an alternate embodiment of the present invention, the device making the read request is informed that the read request must be retried if the read request is made by the device for the first time.

BRIEF DESCRIPTION OF THE DRAWINGS

The present invention is illustrated by way of example and not by way of limitation in the figures of the accompanying drawings, in which like references indicate similar elements and in which.

DETAILED DESCRIPTION

Figure 1:
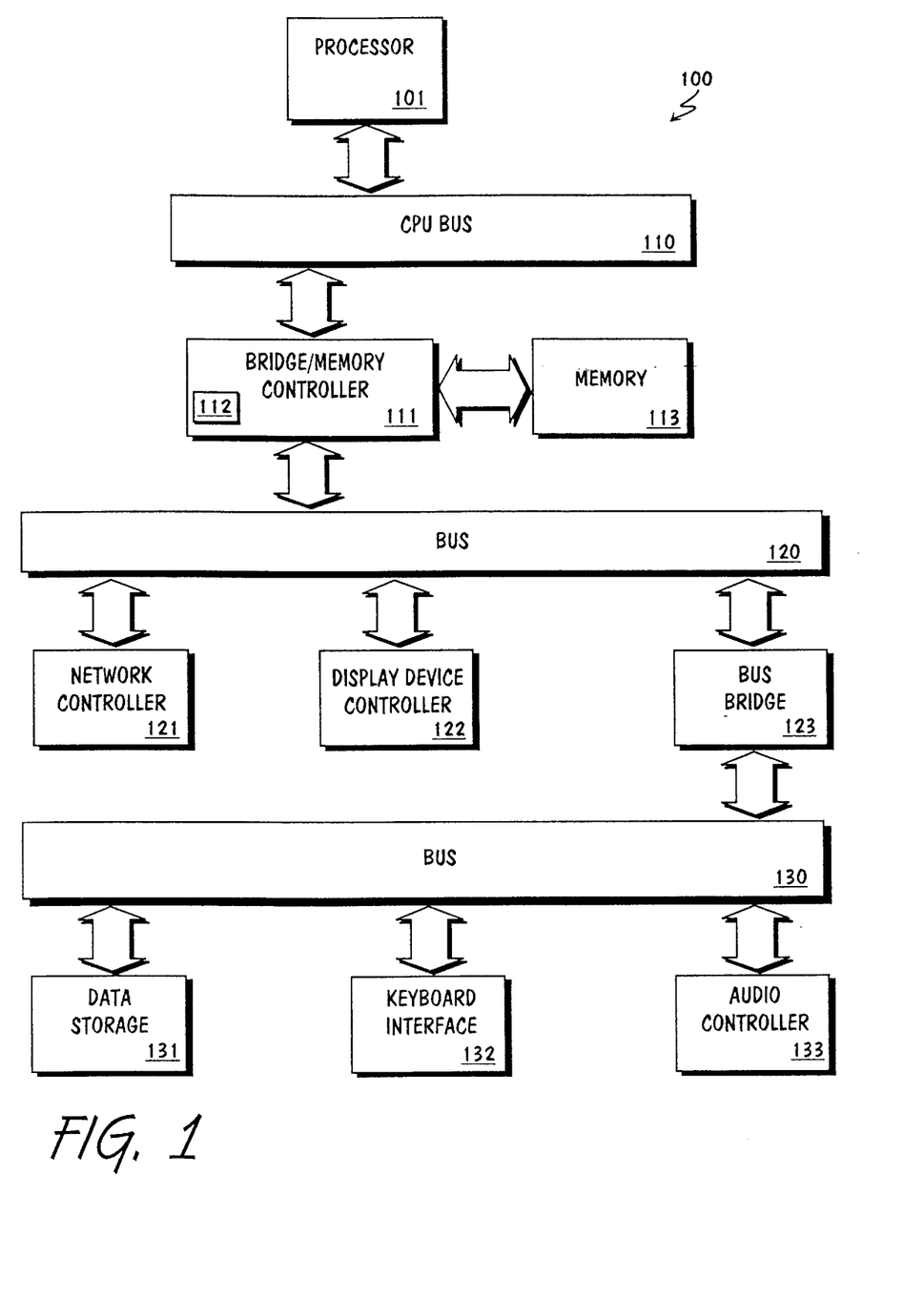
FIG. 1 illustrates a block diagram of a computer system implementing the present invention.

Referring to FIG. 1, a computer system upon which an embodiment of the present invention can be implemented is shown as 100. The computer system 100 comprises a processor 101 that processes digital data. The processor 101 can be a complex instruction set computer (CISC) microprocessor, a reduced instruction set computing (RISC) microprocessor, a very long instruction word (VLIW) microprocessor, a processor implementing a combination of instruction sets, or other processor device. FIG. 1 shows an example of the present invention implemented on a single processor computer system 100. However, it is understood that the present invention can be implemented in a computer system having multiple processors. The processor 101 is coupled to a CPU bus 110 which transmits signals between the processor 101 and other components in the computer system 100.

As an example, memory 113 can be a dynamic random access memory (DRAM) device, a static random access memory (SRAM) device, or other memory device. The memory 113 stores information or other intermediate data that are executed by the processor 101. A bridge memory controller 111 is coupled to the CPU bus 110 and the memory 113. The bridge memory controller 111 directs data traffic between the processor 101, the memory 113, and other components in the computer system 100 and bridges signals from these components to a high speed I/O bus 120. The bridge memory controller 111 comprises a memory controller unit 112. The memory controller unit 112 operates to determine whether a read request to access the memory 113 should be deferred and retried. The memory control unit 112 blocks read requests from being retried until the access time for completing the read request has expired and the data from the read request is available. The memory control unit 112 also recognizes when a read request is being retried and gives a higher priority to these requests when arbitrating access to the memory 113.

The high speed I/O bus 120 supports peripherals operating at high data throughput rates. The high speed I/O bus 120 can be a single bus or a combination of multiple buses. As an example, the high speed I/O bus 120 can comprise a Peripheral Components Interconnect (PCI) bus, a Personal Computer Memory Card International Association (PCMCIA) bus or other buses. The high speed I/O bus 120 provides communication links between components in the computer system 100. A network controller 121 links a network of computers together and provides communication among the machines. A display device controller 122 is coupled to the high speed I/O bus 120. The display device controller 122 allows coupling of a display device to the computer system 100 and acts as an interface between the display device and the computer system 100. The display device controller 122 can be a monochrome display adapter (MDA) card, a color graphics adapter (CGA) card, enhanced graphics adapter (EGA) card, extended graphics array (XGA) card or other display device controller. The display device can be a television set, a computer monitor, a flat panel display or other display device. The display device receives information and data from the processor 101 through the display device controller 122 and displays the information and data to the user of the computer system 100.

The I/O bus 130 is used for communicating information between peripheral devices that operate at lower throughput rates. The I/O bus 130 can be a single bus or a combination of multiple buses. As an example, the I/O bus 130 can comprise an Industry Standard Architecture (ISA) bus, an Extended Industry Standard Architecture (EISA) bus or a Micro Channel Architecture (MCA) bus. The I/O bus 130 provides communication links between components in the computer system 100. A keyboard interface 132 can be a keyboard controller or other keyboard interface. The keyboard interface 132 can be a dedicated device or can reside in another device such as a bus controller or other controller. The keyboard interface 132 allows coupling of a keyboard to the computer system 100 and transmits signals from a keyboard to the computer system 100. A data storage device 131 can be a hard disk drive, a floppy disk drive, a CD-ROM device, a flash memory device or other mass storage device. An audio controller 133 operates to coordinate the recording and playing of sounds is also coupled to the I/O bus 130. A bus bridge 123 couples the high speed I/O bus 120 to the I/O bus 130. The bus bridge 123 comprises a translator to bridge signals between the high speed I/O bus 120 and the I/O bus 130.

Figure 2:
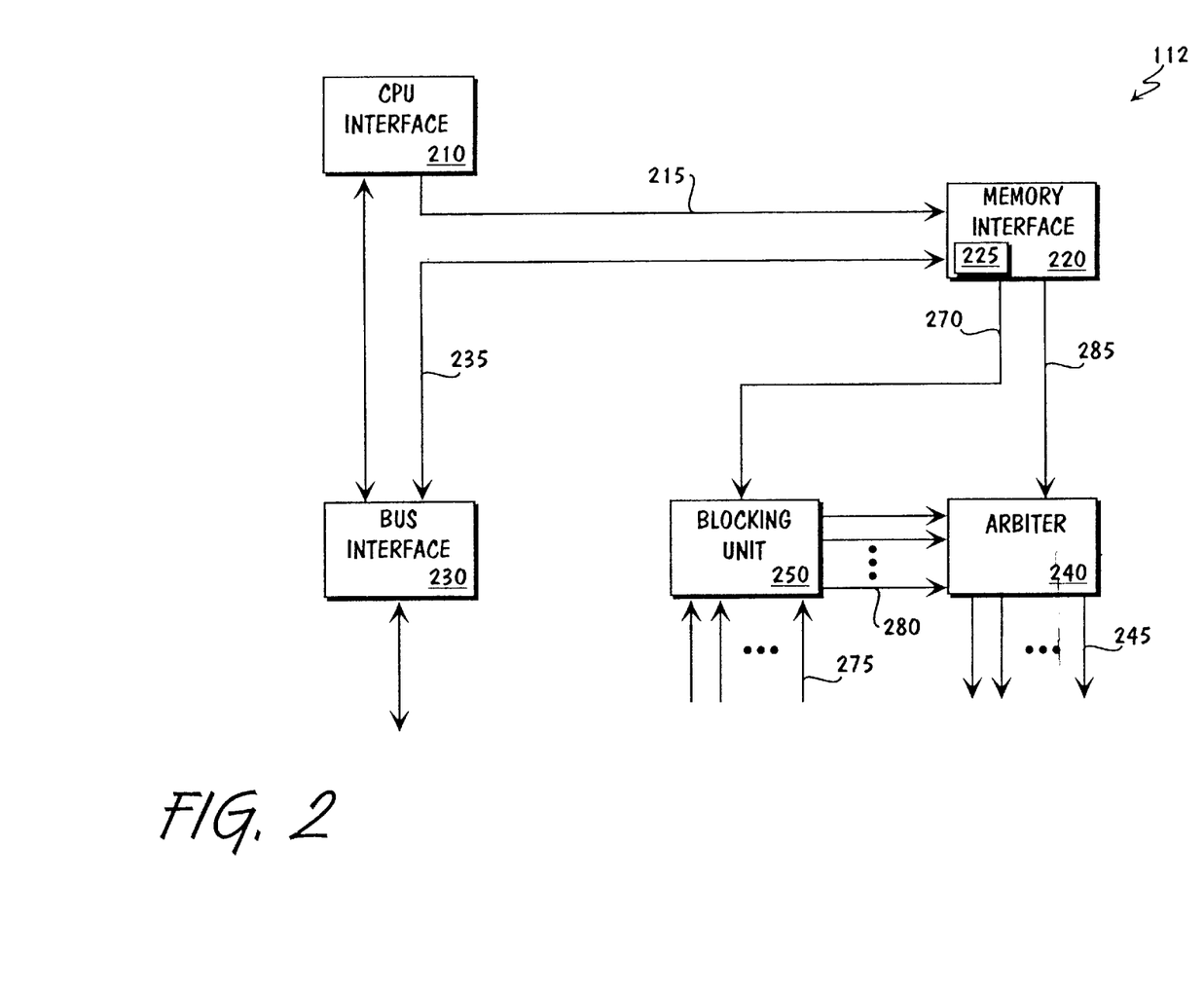
FIG. 2 illustrates a block diagram of a memory controller unit according to the present invention.

FIG. 2 illustrates a block diagram of a memory controller unit according to the present invention. The memory controller unit 112 includes a CPU interface 210 and a bus interface 230. The CPU interface 210 is connected to the CPU bus 110 (shown in FIG. 1) and operates to coordinate requests from the processor 101 (shown in FIG. 1) to access the memory 113 (shown in FIG. 1) or peripheral devices 121–122 and 131–133 (shown in FIG. 1). The CPU interface 210 is coupled to the bus interface 230. The bus interface 230 is connected to the high speed I/O bus 120 (shown in FIG. 1) and operates to coordinate requests from peripherals on the high speed I/O bus 120 to access the memory 113 or the processor 101. According to one embodiment of the present invention, the bus interface 230 is a PCI bus interface and the high speed I/O bus is a PCI bus.

The memory controller unit 112 also includes an arbiter 240. The arbiter 240 operates to arbitrate access to a memory interface 220 via address and data lines 235. The arbiter 240 is connected to a plurality of peripheral devices on the high speed I/O bus via GRANT lines 245 and REQUEST lines 275, blocking unit 250, and lines 280. Each peripheral device on the high speed I/O bus is connected to one REQUEST line and one GRANT line. In order to access the memory, a peripheral device must first make a request to use the address and data lines 235 to the memory interface 220 by issuing a REQUEST signal on its corresponding REQUEST line. The REQUEST signal is passed to the arbiter 240 through the blocking unit 250 and one of the lines 280 corresponding to the peripheral device. The arbiter 240 arbitrates access to the address and data lines 235 among other peripherals making a request for using the address and data lines 235. The arbiter includes a queue for normal priority requests for using the address and data lines 235 and a high priority queue for using the address and data lines 235. The arbiter 235 arbitrates access to the requests on the high priority queue before arbitrating access to the request on the normal priority queue. Read requests made for the first time are referred to as original read requests and are placed in the normal request queue. Read requests that are retried are referred to as retried read requests and are placed in the high priority queue. When the address and data lines 235 are available for the peripheral device to use, a GRANT signal is issued by the arbiter 240 to the peripheral device via the peripheral device's corresponding GRANT line.

Upon receiving the GRANT signal, the peripheral device forwards its request to access specific addresses in memory to the memory interface 220 via the bus interface 230 and address and data lines 235. The memory interface 220 puts the requested information in a queue to be processed. The peripheral device then waits for its read request to be processed and for the data to be retrieved. The PCI Local Bus Specification requires that the peripheral device relinquish the address and data lines 235 after a predetermined period of time to allow other PCI device to access the memory. If the data cannot be retrieved within the predetermined period of time, the peripheral device must attempt to retrieve the requested information from memory at a later time. Typically, upon receiving a deferred read signal that indicates that a read request must be retried, the peripheral device making a read request reissues another REQUEST signal on its request line to access the address and data lines 235 regardless if the data requested from memory is ready.

Blocking unit 250 is coupled to REQUEST lines 275 and lines 280. The blocking unit 250 operates to block a REQUEST signal made by a peripheral device retrying a read request from reaching the arbiter 240 until the data requested by the peripheral device is ready. By blocking REQUEST signals from reaching the arbiter 240, the blocking unit 250 prevents peripheral devices from accessing the address and data lines 235 prematurely before the data associated with their read request is ready to be retrieved. This reduces the number of failed retry requests made by peripheral devices and hence maximizes the allocation of bandwidth on the high speed I/O bus.

The memory controller 112 also includes a memory interface 220. The memory interface 220 is connected to the memory and operates to coordinate requests to access the memory from the processor and peripheral devices on the high speed I/O bus. The memory interface 220 includes a memory access timing unit 225 that determines an access time of a read request. If the read request is deferred, the memory access timing unit 225 records the identity of the peripheral device making the read request and generates a data ready signal after the access time expires. The data ready signal is sent to the blocking unit 250 via line 270 to indicate that the data associated with the read request made by the peripheral device has been retrieved. In response to receiving the data ready signal associated with a read request, the blocking unit 250 allows a REQUEST signal generated by the peripheral device to be forwarded to the arbiter 240 via one of the lines 280 corresponding to the peripheral device.

The memory access timing unit 225 of the memory interface 220 also generates a high priority request signal when the access time has expired. The high priority request signal is sent to the arbiter 240 via line 285. The high priority request signal identifies a read request that is being retried and should be placed in a high priority queue in the arbiter unit 240. By placing the retried read request in a high priority queue, the time required for completing a successful retry is minimized. This frees the peripheral device making the read request allowing it to perform other tasks.

According to one embodiment of the present invention, the bus interface 230 automatically issues a deferred read signal to the peripheral device when the read request is an original read request made by the peripheral device for the first time. The bus interface 230 may be configured to recognize when a read request is an original read request made by a peripheral device for the First time and when a read request is a retried read request. The bus interface 230 may be configured to recognize when a read request is made by a peripheral device for the first time upon receiving a signal from the memory interface 220 indicating that the read request is an original read request. According to an alternate embodiment of the present invention, the memory interface 220 issues a deferred read signal to the peripheral device when the access time of the read request is longer than the predetermined period of time.

It should be appreciated that the CPU interface 210, the memory interface 220, the bus interface 230, the arbiter 240, and the blocking unit 250 may be implemented by any known circuitry. According to one embodiment of the present invention, the CPU interface 210, the memory interface 220, the bus interface 230, the arbiter 240, and the blocking unit 250 reside on a single semiconductor substrate.

Figure 3:
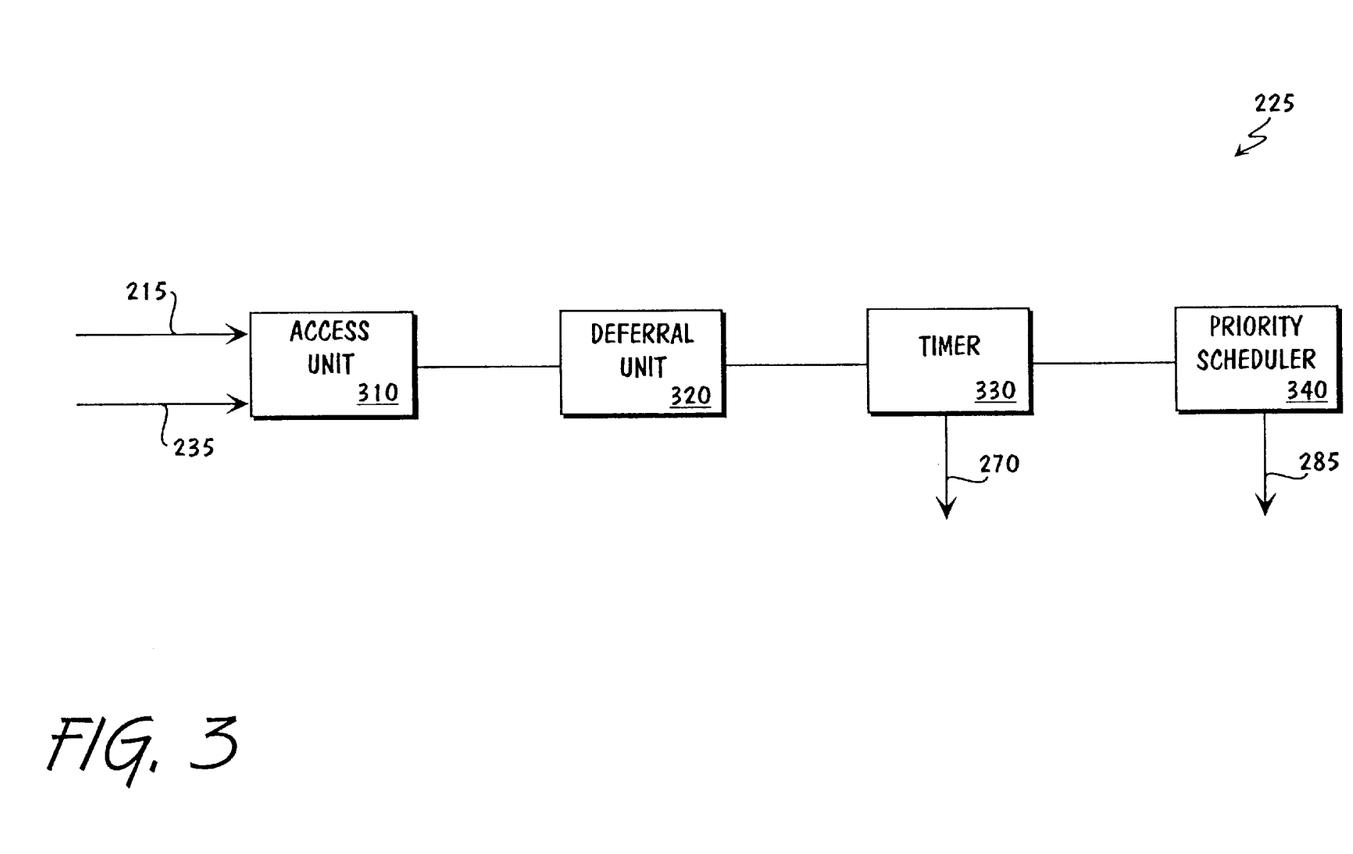
FIG. 3 illustrates an embodiment of a memory access unit according to the present invention.

FIG. 3 illustrates an embodiment of a memory access unit according to the present invention. The memory access timing unit 225 includes an access unit 310. The access unit 310 is coupled to the address and data lines 235 from the bus interface 230 (shown in FIG. 2) that forward information regarding requests made by peripheral devices to access the memory 113 (shown in FIG. 1). The access unit 310 is also coupled to address and data lines 215 from the CPU interface 210 (shown in FIG. 2) that forward information regarding requests made by the processor 101 (shown in FIG. 1) to access the memory 113. The access unit 310 coordinates requests to access the memory and determines an access time for each request made. The access time is the time required to complete the request to access the memory. The access time may be determined by the access unit 310 using any known technique.

The memory access timing unit 225 also includes a deferral unit 320 coupled to the access unit 310. The deferral unit 320 receives the identity of peripheral devices making read requests to the memory and the access times required for completing the read requests. According to one embodiment of the memory access timing unit 225, the deferral unit 320 operates to record the identity of a peripheral device making a read request that is deferred. According to an alternate embodiment of the memory access timing unit 225, the deferral unit 320 generates a deferred read signal when the access time for a read request is longer than a predetermined period of time. The deferral unit 320 forwards the deferred read signal to the peripheral device making the read request that must be retried.

A timer 330 is coupled to the deferral unit 320. The timer 330 operates to determine when an access times of a read request that has been deferred has expired. The timer 330 generates a data ready signal when the access time of read request has expired and forwards the data ready signal to the blocking unit 250 (shown in FIG. 2) via line 270, as directed by the deferral unit 320. According to an embodiment of the present invention line 270 represents a plurality of lines, where each of the lines correspond to a data ready state of one of the peripheral devices coupled to the high speed I/O bus 120 or the I/O bus 130 (shown in FIG. 1).

A priority scheduler 340 is coupled to the timer 330. The priority scheduler 340 operates to output a high priority request signal to the arbiter 240 (shown in FIG. 2) via line 285 when the access time has expired to indicate to the arbiter that a read request made by a peripheral device is a retried read request. It should be appreciated that the access unit 310, the deferral unit 320, the timer 330, and the priority scheduler 335 can be implemented by any known circuitry. According to one embodiment of the memory access unit 225, the access unit 310, the deferral unit 320, the timer 330, and the priority scheduler 340 reside on a single semiconductor substrate.

Figure 4:
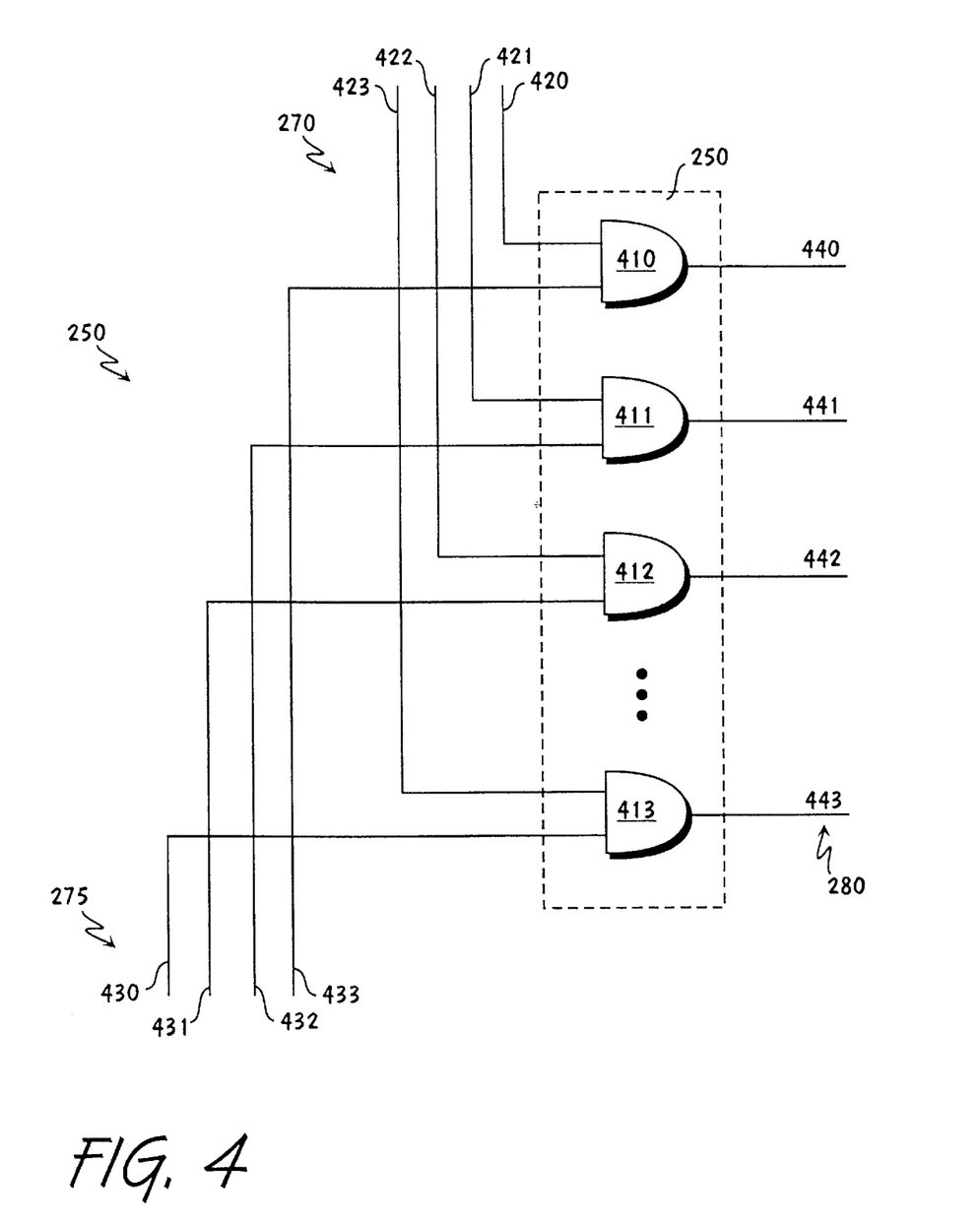
FIG. 4 illustrates an embodiment of a blocking unit according to the present invention.

FIG. 4 illustrates a blocking unit according to one embodiment of the memory controller unit. The blocking unit 250 includes a plurality of AND gates 410–413. Each peripheral device on the high speed I/O bus 120 and the I/O bus 130 (shown in FIG. 1) has a corresponding REQUEST line. For example, a first peripheral device is coupled to REQUEST line 433 and sends REQUEST signals to the arbiter 240 (shown in FIG. 2) via REQUEST line 433. Likewise, an nth number peripheral device is coupled to REQUEST line 430 and sends REQUEST signals to the arbiter 240 via REQUEST line 430, where n can be any number.

The AND gates 410–413 operates to block the REQUEST signals generated on lines 430–433 from reaching the arbiter until the memory interface 220 (shown in FIG. 2) indicates that data requested by a peripheral device is ready by sending a data ready signal to the AND gate blocking the REQUEST signal. The data ready signals are sent to the AND gates via lines 420–423. For example, when data requested by the first peripheral device is ready, the memory interface 220 sends a data ready signal to AND gate 410 via line 420. Likewise, when data requested by the nth peripheral is ready, the memory interface 220 sends a data ready signal to AND gate 413 via line 423. When an AND gate receives both a REQUEST signal from a peripheral device and a data ready signal from the memory interface 220, the REQUEST signal is passed to the arbiter 240. By allowing only REQUEST signals from peripheral devices which have data ready to reach the arbiter 240, the blocking unit 250 minimizes the number of failed retry requests from being processed. According to an embodiment of the present invention, the data ready signal is sent from the memory interface 220 to the blocking unit 250 when a peripheral device is making a request for the first time. This allows non-retry REQUEST signals to pass to the arbiter unblocked.

Figure 5:
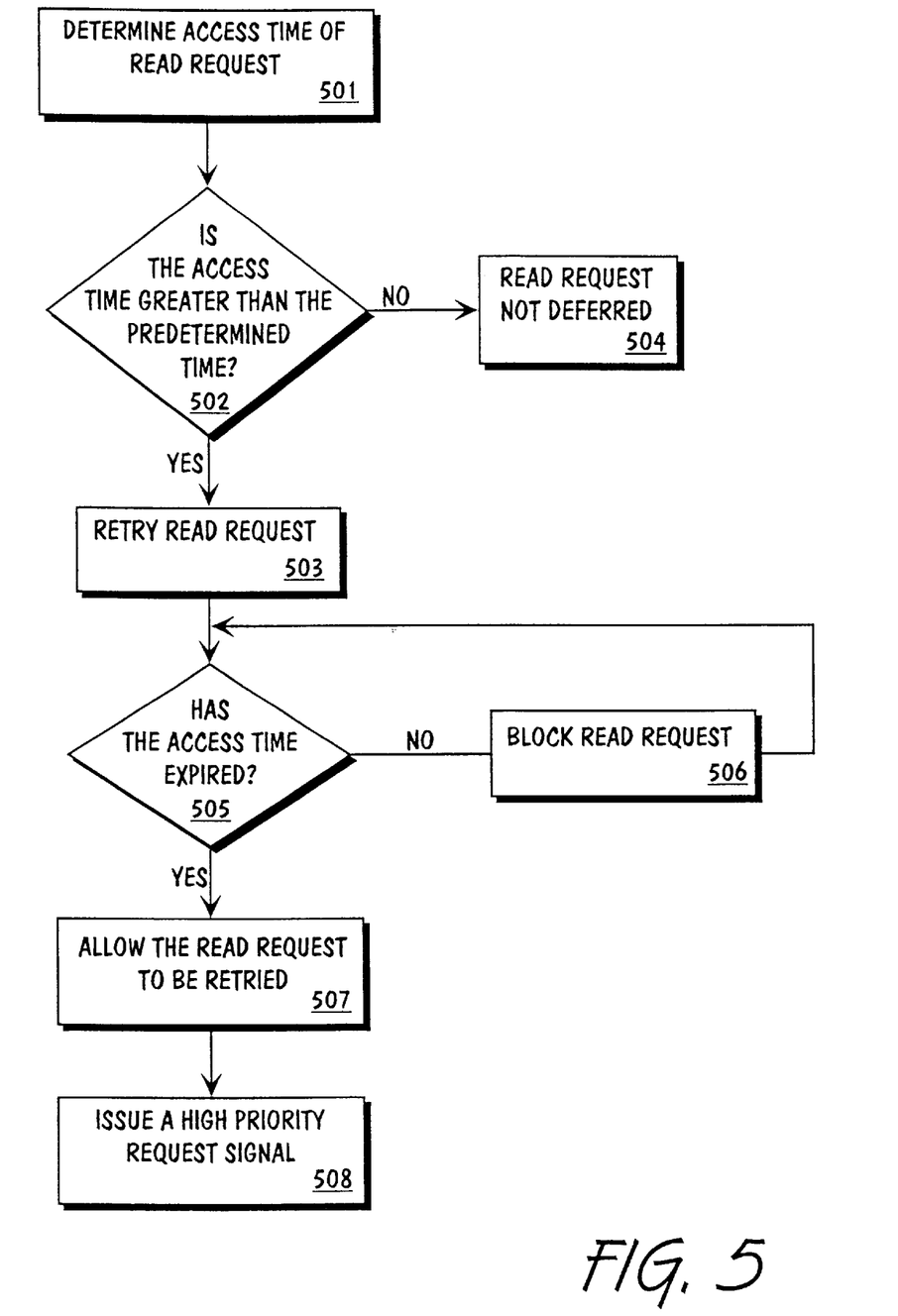
FIG. 5 is a flow chart illustrating a method of arbitrating deferred read requests.

FIG. 5 is a flow chart illustrating a method for arbitrating deferred read requests according to an embodiment of the present invention. At step 501, the access time of a read request is determined.

At step 502, it is determined whether the access time is greater than a predetermined period of time. If the access time is greater than the predetermined period of time, proceed to step 503. If the access time is not greater than the predetermined period of time, proceed to step 504. According to an embodiment of the present invention, the predetermined period of time is determined by the PCI Local Bus Specification.

At step 503, the device making the read request is informed that the read request must be retried.

At step 504, the read request does not have to be retried. The device waits for the data to be retrieved from memory. According to an alternate embodiment of the present invention, a read request made for the first time is deferred without determining whether its access time is greater than the predetermined period of time. Thus, steps 502–504 are not performed.

At step 505, it is determined whether the access time has expired. If the access time has not expired, proceed to step 506. If the access time has expired, proceed to step 507. According to an embodiment of the present invention, a data ready signal is issued to the blocking unit after the access time for a read request has expired. Upon receipt of the data ready signal, the blocking unit recognizes that the access time has expired.

At step 506, read requests are blocked from being retried. According to an embodiment of the present invention, REQUEST signals are prevented from reaching the arbiter by a blocking unit.

At step 507, the read request signals is allowed to be retried.

At step 508, a high priority request signal is issued. According to an embodiment of the present invention, the high priority request signal is sent to the arbiter which responds by placing the read request on a high priority request queue.

In the foregoing description, the invention is described with reference to specific exemplary embodiments thereof. It will, however, be evident that various modifications and changes may be made thereto without departing from the broader spirit and scope of the present invention as set forth in the appended claims. The specification and drawings are, accordingly to be regarded in an illustrative rather than a restrictive sense.

What is claimed is:

1. An apparatus, comprising:
   a memory interface to determine an access time of an original read request and assert a data ready signal when the access time has expired;
   an arbiter unit, coupled to the memory interface, to arbitrate access to the memory interface;
   a priority scheduler to assert a high priority request signal to the arbiter when the access time has expired; and
   a blocking unit, coupled to the memory interface and the arbiter unit, wherein the blocking unit comprises a circuit to perform an AND function with the data ready signal and a read request signal corresponding to a retry of the original read request; and
   informs a device making the original read request that the original read request must be retried if the original read is made for the first time.

2. The apparatus of claim 1 wherein the bus interface is to issue a deferred read signal to a device making the original read request upon receiving a signal from the memory interface.

3. The apparatus of claim 1, wherein the memory interface comprises:
   an access unit to determine the access time of the original read request;
   a deferral unit, coupled to the access unit, to record an identity of a device making the original read request; and
   a timer, coupled to the deferral unit, to record the access time of the original read request and assert the data ready signal when the access time has expired.

4. The apparatus of claim 1, wherein the arbiter unit is to place a read request signal corresponding to the retry of the original read request on a high priority read request queue upon receiving the high priority request signal from the priority scheduler.

5. An apparatus, comprising:
   a memory interface to determine an access time of an original read request, assert a deferred read signal when the access time is longer than a predetermined period of time and assert a data ready signal when the access time has expired;
   an arbiter unit, coupled to the memory interface, to arbitrate access to the memory interface;
   a deferral unit, coupled to the memory interface, to record an identity of a device making the original read request; and
   a blocking unit, coupled to the memory interface and the arbiter unit, wherein the blocking unit comprises a circuit to perform an AND function with the data ready signal and a read request signal corresponding to the retry of the original read request; and
   informs a device making original read request that the original read request must be retried if the original read request is made for the first time.

6. The apparatus of claim 5, wherein the memory interface comprises:
   an access unit that determines the access time of the original read request;
   a deferral unit, coupled to the access unit, that records an identity of device making the original read request and that generates the deferred read signal to the device making the original request when the access time exceeds the predetermined period of time; and
   a timer, coupled to the deferral unit, that records the access time of the original read request and outputs the data ready signal when the access time has expired.

7. The apparatus of claim 5, wherein the memory interface further comprises a priority scheduling unit that outputs a high priority request signal to the arbiter when the access time has expired.

8. The apparatus of claim 7, wherein the arbiter unit places the retry read request on a high priority read request queue upon receiving the high priority request signal from the priority scheduling unit.

9. A computer system, comprising:
   a bus;
   a processor coupled to the bus;
   a memory coupled to the bus; and a memory controller, comprising a memory interface to determine an access time of an original read request, the memory interface to assert a data ready signal when the access time has expired, an arbiter unit, coupled to the memory interface, to arbitrate access to the memory interface, wherein the arbiter unit is to place a read request signal corresponding to the retry of the original read request on a high priority read request queue upon receiving the high priority request signal; and a blocking unit, coupled to the memory interface and the arbiter unit, wherein the blocking unit comprises a circuit to perform an AND function with the data ready signal and a read request signal corresponding to the retry of the original read request; and informs a device making the original read request that the original read request must be retried if the original read request is made for the first time.

10. The computer system of claim 9, further comprising a bus interface, coupled to the memory interface, to issue a deferred read signal to a device making the original read request upon receiving a signal from the memory interface.

11. The computer system of claim 9, wherein the memory interface is to issue a deferred read signal when the access time is longer than a predetermined period of time.

12. A method for arbitrating read requests to a memory, comprising:

determining an access time of a read request;

issuing a deferred read signal to a device making an original read request upon receiving a signal from a memory interface; and blocking the read request from being retried until the access time has expired, wherein the blocking the read request comprises performing an AND function with a data ready signal and a read request signal corresponding to the retry of the original read request; and informing a device making the read request that the read request must be retried if the read request is made for the first time.

13. The method of claim 12, further comprising informing a device making the read request that the read request must be retried if the access time is greater than a predetermined period of time.

14. The method of claim 12, further comprising issuing a high priority request signal after the access time expires.

15. The method of claim 14, further comprising placing a read request corresponding to a retry of the read request in a queue of high priority requests upon receiving the high priority request signal.

* * * * *